United States Patent
Seck

(10) Patent No.: US 10,174,262 B2
(45) Date of Patent: Jan. 8, 2019

(54) BIOREFINERY FOR CONVERSION OF CARBOHYDRATES AND LIGNOCELLULOSICS VIA PRIMARY HYDROLYSATE CMF TO LIQUID FUELS

(71) Applicant: Karl A. Seck, Ferndale, WA (US)

(72) Inventor: Karl A. Seck, Ferndale, WA (US)

( * ) Notice: Subject to any disclaimer, the term of this patent is extended or adjusted under 35 U.S.C. 154(b) by 255 days.

(21) Appl. No.: 13/815,308

(22) Filed: Feb. 19, 2013

(65) Prior Publication Data
US 2013/0217932 A1      Aug. 22, 2013

Related U.S. Application Data

(60) Provisional application No. 61/599,798, filed on Feb. 16, 2012.

(51) Int. Cl.
*C10G 3/00*        (2006.01)

(52) U.S. Cl.
CPC ............... *C10G 3/50* (2013.01); *C10G 3/00* (2013.01); *C10G 3/42* (2013.01); *C10G 3/54* (2013.01); *C10G 3/55* (2013.01); *Y02P 30/20* (2015.11)

(58) Field of Classification Search
CPC ............ C10G 3/00; C10G 3/50; C10G 3/60
USPC .................................................. 585/251, 242
See application file for complete search history.

(56) References Cited

U.S. PATENT DOCUMENTS

| | | | | |
|---|---|---|---|---|
| 2,719,863 | A * | 10/1955 | Haslam | C07C 45/72 554/72 |
| 5,254,743 | A * | 10/1993 | Holmgren | B01J 35/0006 568/459 |
| 7,671,246 | B2 * | 3/2010 | Dumesic | B01J 21/10 585/240 |
| 7,880,049 | B2 | 2/2011 | Dumesic et al. | |
| 8,075,642 | B2 | 12/2011 | Dumesic et al. | |
| 2012/0283493 | A1 | 11/2012 | Olson et al. | |

FOREIGN PATENT DOCUMENTS

| | | | | |
|---|---|---|---|---|
| EP | 1 490 457 | 6/2007 | | |
| WO | WO 2007/012585 | 2/2007 | | |
| WO | WO-2008152200 A1 * | 12/2008 | ......... | C10M 105/00 |

(Continued)

OTHER PUBLICATIONS

Mascal et al., High-yield conversion of plant biomass into the key value0added feedstocks 5-(hydroxymethyl)furfural, levulinic acid, and levulinic esters via 5-(chloromethyl)furfural, 2010, Green Chemistry, vol. 12, pp. 370-373.*

(Continued)

*Primary Examiner* — Youngsul Jeong

(57) ABSTRACT

A method of making alkanes from lignocellulosic sources of C5 and C6 sugars. Suitable biomass feedstocks are converted into alkane-based fuels such as diesel and jet fuel blendstocks. Sugar monomers from the feedstocks are converted to chloromethylfurfural (CMF) with a levulinic acid (LA) byproduct. The CMF and LA are converted to ethyl levulinate (EL) and hydroxymethylfurfural (HMF), which are then combined into longer chain molecules via aldol condensation reactions. The condensation products are partially or fully saturated by mild hydrotreating, followed by deoxygenation to form alkanes with boiling ranges suitable for use as liquid fuels.

4 Claims, 6 Drawing Sheets

(56) References Cited

FOREIGN PATENT DOCUMENTS

| WO | WO 2010/141950 | | 12/2010 |
| WO | WO 2013/040311 A1 | * | 3/2013 |

OTHER PUBLICATIONS

Specification of U.S. Appl. No. 61/534,496, filed Sep. 14, 2011.*
Balakrishnan et al., Etherification and reductive etherification of 5-(hydroxymethyl furfural . . . Green Chemistry, 14, 2012, 1626-2634.
Breeden et al., Microwave heating for rapid conversion of sugars . . . Green Chemistry, 15, 2013, 72-75.
Chen et al., Hydrolysis characteristics of sugarcane bagasse pretreated by . . . Applied Energy, 93, 2012, 237-244.
Chen et al., Disruption of sugarcane bagasse lignocellulosic structure . . . Applied Energy, 88, 2011, 2726-2734.
Chheda et al., Liquid-Phae Catalytic Processing of Biomass-Derived . . . Angewandte Chemie, 46, 2007, 7164-7183.
Horstman et al., Derivatives of Methylfurfural, Synthesis, 7, 2011, 1106-1112.
Hoskins, Carbon-carbon bond forming reactions of biomass derived aldehydes, Paper, School of Chemical & Biomolecular Engineering, 2008, 1-83.
Kumari et al., Synthesis of 5-bromomethylfurfural from Cellulose . . . Eur. J. Org. Chem, 2011, 1266-1270.
Gallezot, Conversion of biomass to selected cheamical products, Chem. Soc. Rev., 41, 2012, 1538-1558.
Mascal et al., Direct, high-yield conversion of cellulose into biolfuel, Angew, Chem. Int. Ed., 47, 2008, 7924-7926.
Mascal et al., Dramatic advancements in the saccharide to 5-(chloromethyl)furfural . . . , Chem. Sus. Chem. 2, 2009, 859-861.
Mascal et al., Towards the efficient, total glycan utilization of biomass,Chem. Sus. Chem., 2, 2009, 423,426.
Quiroz-Florentino et al., Total synthesis of naturally occurring furan compounds . . . Synthesis, 7, 2011, 1106-1112.
Roman-Leshkov et al., Production of dimethylfuran for liquid fuels from biomass-derived carbolydrates, Nature, 447, 2007, 982-986.

* cited by examiner

BIOREFINERY FOR CONVERSION OF CARBOHYDRATES AND LIGNOCELLULOSICS VIA PRIMARY HYDROLYSATE CMF TO LIQUID FUELS

RELATED APPLICATIONS

This application claims the benefit of Provisional Patent Application Ser. No. 61/599,798, filed Feb. 16, 2012.

FIELD OF THE INVENTION

The invention relates generally to methods of producing biofuels from carbohydrate and lignocellulosic biomass and more particularly, to a method for conversion of biomass by first converting feedstock into chloromethylfurfural (CMF) then converting the CMF to other intermediates that are condensed together and hydrodeoxgynated to produce diesel and jet fuel products.

BACKGROUND OF THE INVENTION

Today, global climate change and energy national security as well as improvement of air quality, are absolute global priorities. Most cellulosic biofuels technologies are designed to produce gasoline blendstocks such as ethanol. Diesel cellulosic fuels would reduce greenhouse emissions. A cellulosic fuel that is a viable turbine fuel with application to the renewable jet fuel market would also be of great benefit for climate change mitigation and energy national security.

Although cellulose is the most abundant plant material resource, its exploitation has been curtailed by its composite nature and rigid structure. As a result, most technical approaches to convert lignocellulosic material to fuel products have focused on an effective pretreatment to liberate the cellulose from the lignin composite and break down its rigid structure. Besides effective cellulose liberation, a favorable pretreatment can minimize the formation of degradation products because of their wastefulness and inhibitory effects on subsequent processes. One way to improve the efficiency of biomass conversion schemes (biorefineries) is to integrate the energy-intensive lignocellulose depolymerization and dehydration (LDD) process with power production and/or other biomass processing. Some biorefineries rely on conversion of lignocellulose to glucose and subsequent fermentation, but this processing can require expensive enzymes and long contact times or can produce compounds that inhibit the fermentation or that are low-value by-products. In addition, fermentation releases carbon dioxide and produces cell mass, which in some examples can only be efficiently reused as a livestock supplement.

An alternative processing for lignocellulosic materials is acid-catalyzed depolymerization and conversion to the C5 product, levulinic acid, or esters thereof. In general, two methods are used to produce levulinic acid or levulinate ester from lignocellulose. One method uses water with a strong acid catalyst, such as sulfuric acid, to effect the depolymerization and dehydration of lignocellulose to produce the C5 and C1 acids (levulinic and formic acids) (see, for example, U.S. Pat. No. 5,608,105). However, separation of products from the aqueous product solution is difficult. One patent describes a separation scheme that uses an olefin feed to convert the aqueous acid to esters that can be separated from the water and each other (see, for example, U.S. Pat. No. 7,153,996). Of course, a nearby olefin source is required for this process.

Another method uses an alcohol solvent for the acid-catalyzed depolymerization of cellulose, which results in direct formation of the levulinate ester (see, for example, DE 3621517).

Another method of liquid phase catalytic conversion of C6 sugars and the cellulose component of lignocellulosic materials into intermediates for fuel production is described in by Mascal (U.S. Pat. No. 7,829,732 B2), in which chloromethylfurfural (CMF) is formed in high yield.

Another method of liquid phase catalytic conversion of C6 sugars into intermediates, predominately hydroxymethylfurfural (HMF) and further processing for fuel production, is described in by Dumesic (U.S. Pat. No. 7,880,049), in which hydroxymethylfurfural (HMF) is formed in high yield and either self condensed or cross condensed with another aldehydes or ketone before deoxygenating to alkane based fuels.

Published U.S. Patent Application US 2010/0312028 describes a multiproduct biorefinery based on producing levulinic acid or esters thereof from C6 sugar sources, condensing the levulinate with another aldehyde and deoxygenating the condensation products to alkane fuels and other products.

SUMMARY OF THE INVENTION

The present invention is directed to a method of making alkanes from lignocellulosic sources of C5 and C6 sugars. The C6 conversion goes through recovered intermediate chloromethylfurfural (CMF) that is further processed into fuel products.

In a broad aspect the invention provides a method for converting suitable biomass feedstocks into alkane based fuels such as diesel and jet fuel blendstocks, comprising the steps of converting C6 sugar monomers to CMF with a levulinic acid (LA) byproduct, converting the CMF and LA into components suitable for cross aldol condensation reactions, preferably ethyl levulinate (EL) and hydroxymethylfurfural (HMF), condensing the aldehydes and ketone mixture along with furfural made from C5 sugar sources into desired carbon chain lengths, saturating the condensation product by mild hydrotreating, and then deoxygenating the products to a desired mixture of alkanes. The deoxygenation catalyst may be a commercially available NiMo catalyst.

The carbon chain length of the condensate products may be controlled by controlling the ratios of HMF, furfural, and levulinate. Controlling these ratios will control the ratio of mono- and di-aduct products from the condensation reaction. Control over the product ratios will determine the carbon chain length and to some extent the isomerization of the alkane product. Controlling these parameters can enhance fuel properties.

The mild hydrotreating step may be conducted in a way that produces cyclic ether compounds, such as a compound that contains at least one tetrahydrofuran group. This embodiment provides several advantages including: reducing the propensity of the product mixture to form tars when hydrotreated at more severe conditions that would have a deleterious effect on the cycle life of a heterogeneous catalyst, providing an opportunity to recover subject compounds as a product with valuable properties, and recovering the alcohols, most preferably ethanol, from the condensation products to allow the alcohols to recycle to the CMF reaction step of the process.

The condensation step may involve using a catalyst for the condensation reaction, the catalyst being selected from catalyst types tailored to the components that are to be condensed together. Suitable catalysts include liquid base catalysts and solid base catalysts with the preferred being hydrotalcite solid basic catalysts, liquid acid catalysts, and solid acid catalysts.

The mild hydrotreating step may use a heterogeneous catalyst formulation of active metal components incorporated on either a carbon or alumina base. Active components may be selected from a group consisting of Ru, Re/Ru, Re/Pt, Rear, Fe/Pt, Os/Rh, Rh, Ni/Re, Re, Pd/Re, Pd/Zn, Pd/Fe, Pd/Ni, Pd/W, Pd/Co, Pd/Pr, Pd/Cu, Pd/Mn, Pd/V, and combinations thereof.

In another embodiment, production of ethoxymethylfurfural (EMF) may be substituted for HMF production, and used as a reactant for the condensation reactions. The use of EMF is potentially advantageous because of relative its superior relative stability compared to HMF. Additionally, LA may be substituted for EL because it does not require the handling and either procurement or recycle of ethanol.

The invention is useful for the efficient production of alkanes with good fuel properties. For jet fuel these alkanes can have low freeze points and still meet the specifications for gravity and flash point. For diesel fuel, cetane can be high compared to petroleum blends. It is anticipated that a life cycle analysis will qualify both fuels as a cellulosic biofuel for purposes of the Renewable Fuel Standard II (RFS2) as established by the US Environmental Protection Agency. Both fuels can be considered "drop-in" hydrocarbon fuels being compatible with existing petroleum product infrastructure such as terminals and pipelines.

In addition to fuels, byproducts may be produced that can enter the chemical markets as low carbon footprint chemicals. Formic acid and ethyl formate are produced when a C6 sugar derived component is reduced to a C5 derivative such as levulinic acid or ethyl levulinate. Components used to make fuels may for economic benefit be separated and purified for sales into the chemical market as higher valued products. Examples of optional chemical products include ethyl levulinate and furfural.

The invention will be more fully appreciated from a reading of the following detailed description with reference to the accompanying figures.

DETAILED DESCRIPTION

System

Figure 1:
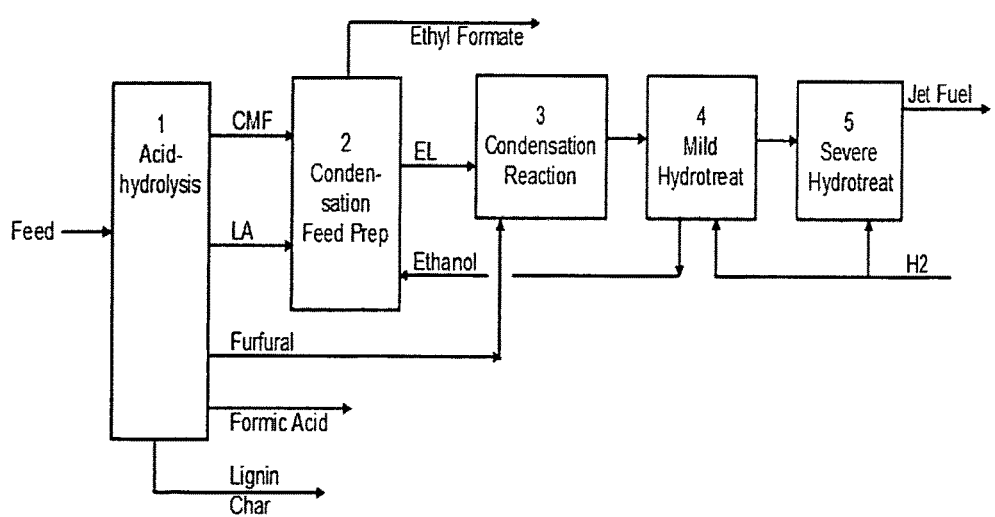
FIG. 1 is a block diagram depicting biorefinery flow in accordance with the present invention.

FIG. 1 illustrates a biorefinery system in accordance with a preferred embodiment of the present invention.

As can be seen therein, feed, which is comprised of any suitable carbohydrate or lignocellulosic feedstock, is fed into 1, a hydrolysis unit, for conversion to intermediates such as CMF, furfural, and LA. Unit 2 is a Condensation Feed Prep unit that converts CMF and LA into HMF and EL in an advantageous ratio. The Condensation unit, 3, converts the products of the Feed Prep and furfural into a mixture of larger carbon chain molecules. Unit 4, a Mild Hydrotreat unit, saturates carbon double bonds and recovers alcohol (such as ethanol) for recycle. Severe Hydrotreating, unit 5, deoxygenates the mixture of Mild Hydrotreating products to produce a mixture of alkanes suitable for diesel and jet fuel blendstock.

Hydrolysis

As noted above with reference to FIG. 1, the first step in a biorefinery in accordance with the present invention is depolymerization of cellulose and the dehydration of the resulting C6 sugar to predominately chloromethylfurfural (CMF). This step can be collectively referred to as acid catalyzed hydrolysis or simply Hydrolysis. The C6 conversion step produces the recovered intermediate CMF by hydrochloric acid catalyzed hydrolysis in a biphasic reactor system. As an example, CMF can be produced and recovered suitably according to the process described by Mascal. The biphasic, using dichlorethane solvent, hydrolysis reaction to CMF can be summarized by the follow reaction:

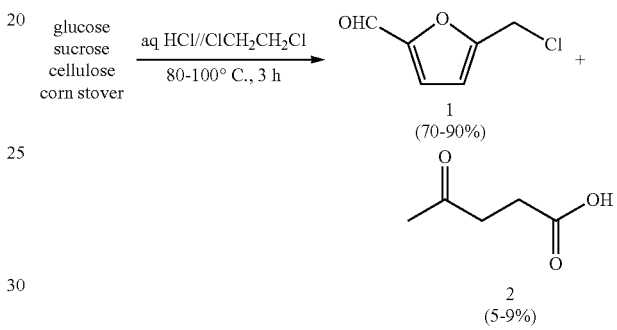

A key to high yields of CMF(1) is the ability to extract into a solvent that creates a biphasic reactor system the desired product, CMF, from the reaction phase before it can further react into less desirable products. The levulinic acid, LA(2), byproduct stays in the aqueous reaction phase and may be extracted for use in subsequent reactions to make fuels. Suitable effective solvents include: dichloromethane, dichloroethane, MIBK, and toluene.

The reactor system may be configured for continuous operation. For example, Brasholz, *Green Chem.*, 2011, 13, 1114 describes refinements to the continuously operating reactor system to produce CMF. Also, high yields of furfural can be produced from C5 sugars monomers contained in the hemicellulose component of lignocellulosic biomass.

The toluene and MIBK can be used as effective solvents for converting fructose to CMF in a flow reactor. In testing, fructose was converted to CMF using 37% HCl concentration at 100 deg C., for 1 minute residence time in toluene solvent. Conversion was measured at 89% of theoretical, with 87% of the conversion to CMF.

Condensation Feed Preparation

In the Condensation Feed Preparation (Feed Prep) step, CMF and LA produced and recovered in the Hydrolysis step are converted into a mixture of components more suitable for the subsequent condensation reactions.

In a preferred embodiment, two main reactions are included in this step. First is the conversion of CMF into ethyl levulinate (EL) (6a), as summarized below:

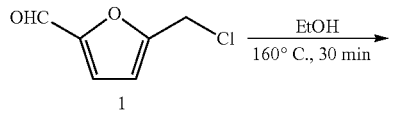

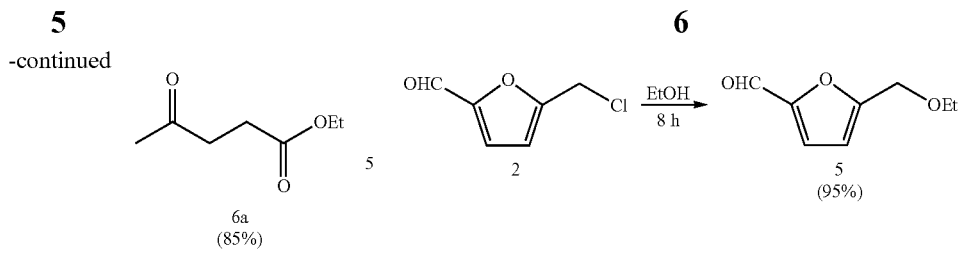

Second is the conversion of CMF(1) to HMF(5) and LA(2) byproduct as below:

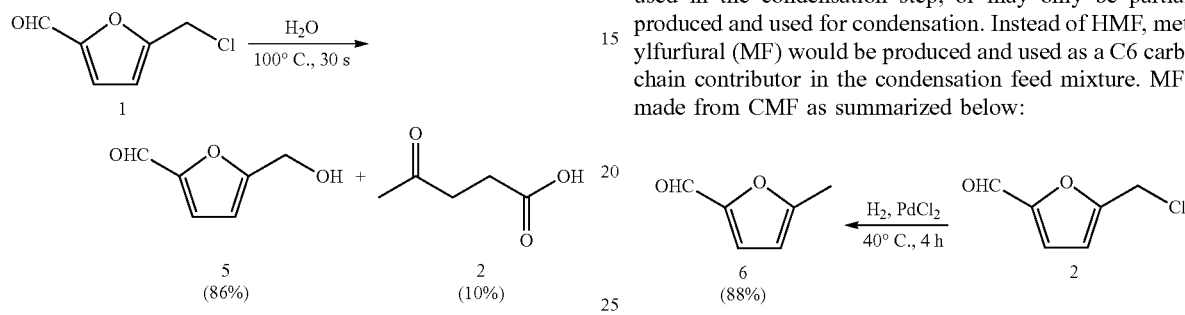

Using a combination of these two main reactions, along with conversion of the LA(2) byproduct to EL, a feed is prepared for the condensation reactions that, when combined with furfural from the Hydrolysis step, will lead to carbon chain lengths and degrees of isomerisation that are advantageous to the final fuel properties.

For example, to obtain a mixture of alkanes with the approximate composition: C10, 40%; C11 55%; C17 5% approximately 45% of the CMF may be converted to HMF and 55% to EL (chain lengths and percentages are approximate). Levulinic esters of other alcohols such as methanol, propanol, and butanol may be used as substitutes for EL.

In another embodiment, EL is not produced or used in the condensation step or may only be partially produced and used for condensation. Instead of EL, LA would be produced and used as a C5 carbon chain contributor in the condensation feed mixture. LA is made from CMF as summarized below:

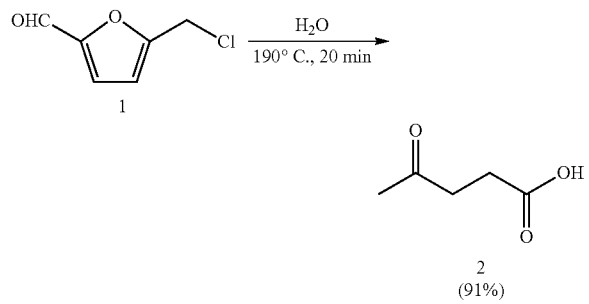

The LA(2) can be extracted from the aqueous phase, if necessary, to be a component in the condensation step feed.

In another embodiment, HMF is not produced or used in the condensation step, or may only be partially produced and used for condensation. Instead of HMF, ethoxymethylfurfural (EMF) would be produced and used as a C6 carbon chain contributor in the condensation feed mixture. EMF is made from CMF as summarized below:

EMF may be substituted for HMF if concerns about the stability of this intermediate in the route to fuel become important from a techno-economic standpoint.

In still another embodiment, HMF is not be produced or used in the condensation step, or may only be partially produced and used for condensation. Instead of HMF, methylfurfural (MF) would be produced and used as a C6 carbon chain contributor in the condensation feed mixture. MF is made from CMF as summarized below:

MF may be substituted for HMF if concerns about the stability of this intermediate in the route to fuel become important from a techno-economic standpoint.

Condensation

Aldol condensation reactions are well known methods for reacting ketones and aldehydes so that one or more molecules are joined together by C—C bonds. In the present invention, aldol reactions are used to combine one or two furfural or HMF molecules to one EL or LA molecule to control the product carbon chain length, so that the subsequent steps produce fuel products with the desired characteristics.

In a preferred embodiment, the carbon chain length of the condensate products are controlled by controlling the ratios of HMF, furfural, and EL. Controlling these ratios will control the ratio of mono- and di-aduct products from the condensation reaction. Control over the product ratios will determine the carbon chain length and to some extent the isomerization of the alkane product.

The Claisen-Schmidt or Stobbe condensation of ethyl levulinate with furfural is effected with liquid base system at lower temperatures (ambient to 60° C.), although removal of base catalyst from the products via neutralization and extraction is needed. Solid base catalysts in the form of hydrotalcites are effective catalysts for the condensation of ethyl levulinate with furfural, but the temperature must be raised to 135°-150° C. The products are a mix of mono- and difuryl substituted levulinates. Much of the product is hydrolyzed to the acid form or is present as the lactone. Acid catalysts were not effective for the condensation of ethyl levulinate with furfural.

Testing demonstrated that the condensation reactions of levulinic acid obtained from the acid-catalyzed decompositions conducted in aqueous acid were successful, giving good conversions with furfural. Liquid acid catalysts in a solvent, and solid acid catalysts without a solvent, gave 68%-91% conversions when the temperature was over 60° C. Reactions of levulinic acid with furfural with a basic catalyst were not successful.

Mild Hydrotreating

Products from the Condensation step are next processed in a Mild Hydrotreating step. Performing a mild hydrotreating before the more severe complete hydrodeoxygenation has several advantages, including but not limited to: Reducing the propensity of the product mixture to form tars when hydrotreated at more severe conditions, that would have a deleterious effect on the cycle life of a heterogeneous catalyst; providing an opportunity to recover subject compounds as a product with valuable properties, and recovery the alcohol (most desirably ethanol) from the condensation products; allowing the alcohols to recycle to the CMF reaction step of the invention.

The products from the Condensation step contain one or more double carbon bonds, commonly shown as C=C. Double bonds are present in both the furan ring portion of the compound and the alkyl or straight chain carbon structures. Double bonds are well known to cause polymerization and tar formation at conditions used for hydrotreating. By saturating the double bonds to single bonds the compound becomes more stable at more severe hydrotreating conditions. When a feed mixture can be hydrotreated with much less tar formation the cycle life of the heterogeneous catalyst can be greatly extended.

Mild hydrotreating of the condensation products with certain catalysts can favor the formation of cyclic ethers most preferably compounds containing at least one tetrahydrofuran ring. These components can have properties that would be advantageous as diesel additives. These compounds are anticipated to have very high cetane and lower particulate matter formation in diesel engines.

When an alcohol (for example, ethanol) is used to create a condensation feed mixture component, that alcohol is potentially not included in the final fuel range product. For example, if ethanol is used to make EL, which in turn is used to make a condensation product that is severely hydrotreated the ethanol will be converted into ethane at the severe conditions. Since ethane is less valuable than ethanol this reaction is generally not desirable. Careful choice of catalyst and reactor conditions can recover the ethanol as ethanol, that can either be recycled to the Feed Prep step or sold a near the same price as it was purchased.

Several catalyst formulations were screened to determine the amount of conversion to cyclic ether and ethanol recovery. The mild hydrotreating step was tested at a bench scale using a heterogeneous catalyst formulation of active metal components incorporated on either a carbon or alumina base. Active components are selected from a group consisting of Ru, Re/Ru, Re/Pt, Re/Ir, Fe/Pt, Os/Rh, Rh, Ni/Re, Re, Pd/Re, Pd/Zn, Pd/Fe, Pd/Ni, Pd/W, Pd/Co, Pd/Pr, Pd/Cu, Pd/Mn, Pd/V, and combinations thereof.

Initial catalyst screening investigated the catalyst formulations shown below:

| Catalyst ID | Composition | Specifications |
| --- | --- | --- |
| 14388-79-4 | Ru | 5.0% Ru on Carbon (Hyperion) |
| 14388-93-2 | Re | 5.0% Re on Carbon (Norit ROX 0.8) |
| 58419-10-1 | Pd/Re | 2.5% Pd/2.2% Re on Carbon (Norit ROX 0.8) |
| 14388-87-2 | Re/Ru | 5.0% Re/3.0% Ru on Carbon (Hyperion) |
| 14388-87-1 | Re/Pt | 5.0% Re/2.0% Pt on Carbon (Norit ROX 0.8) |
| 102654-A2 | Re/Ni | 5.0% Ni/1.0% Re on Carbon (Norit ROX 0.8) |
| 14388-87-5 | Re/Ir | 5.0% Re/5.0% Ir on Carbon (Norit ROX 0.8) |

-continued

| Catalyst ID | Composition | Specifications |
| --- | --- | --- |
| 58959-136-7 | Fe/Pt | 5.0% Fe/1.0% Pt on Carbon (Norit ROX 0.8) |
| 58959-128-2 | Os/Rh | 5.0% Os/1.0% Rh on Carbon (Norit ROX 0.8) |
| 14388-39-1 | Rh | 5.0% Rh on Alumina (Puralox) |

Figure 2:
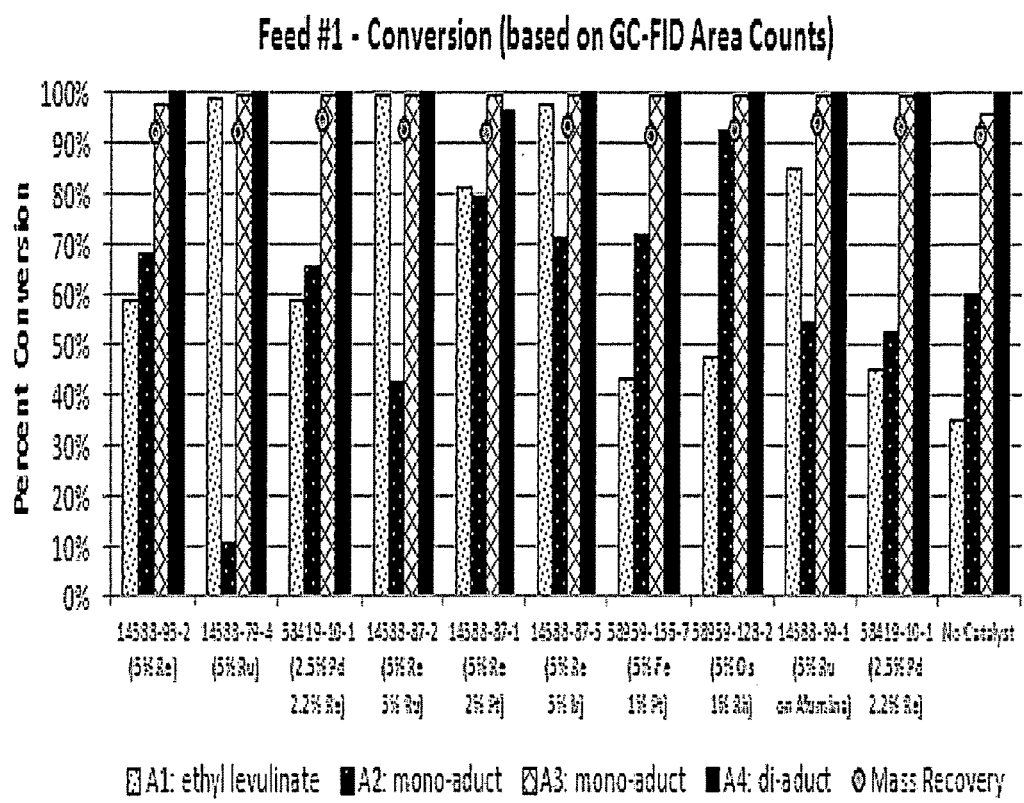
FIGS. 2, 3, 4, and 5 are charts showing conversion and product distribution for two different feeds that were selectively hydrotreated in a catalyst screening study.
Figure 3:
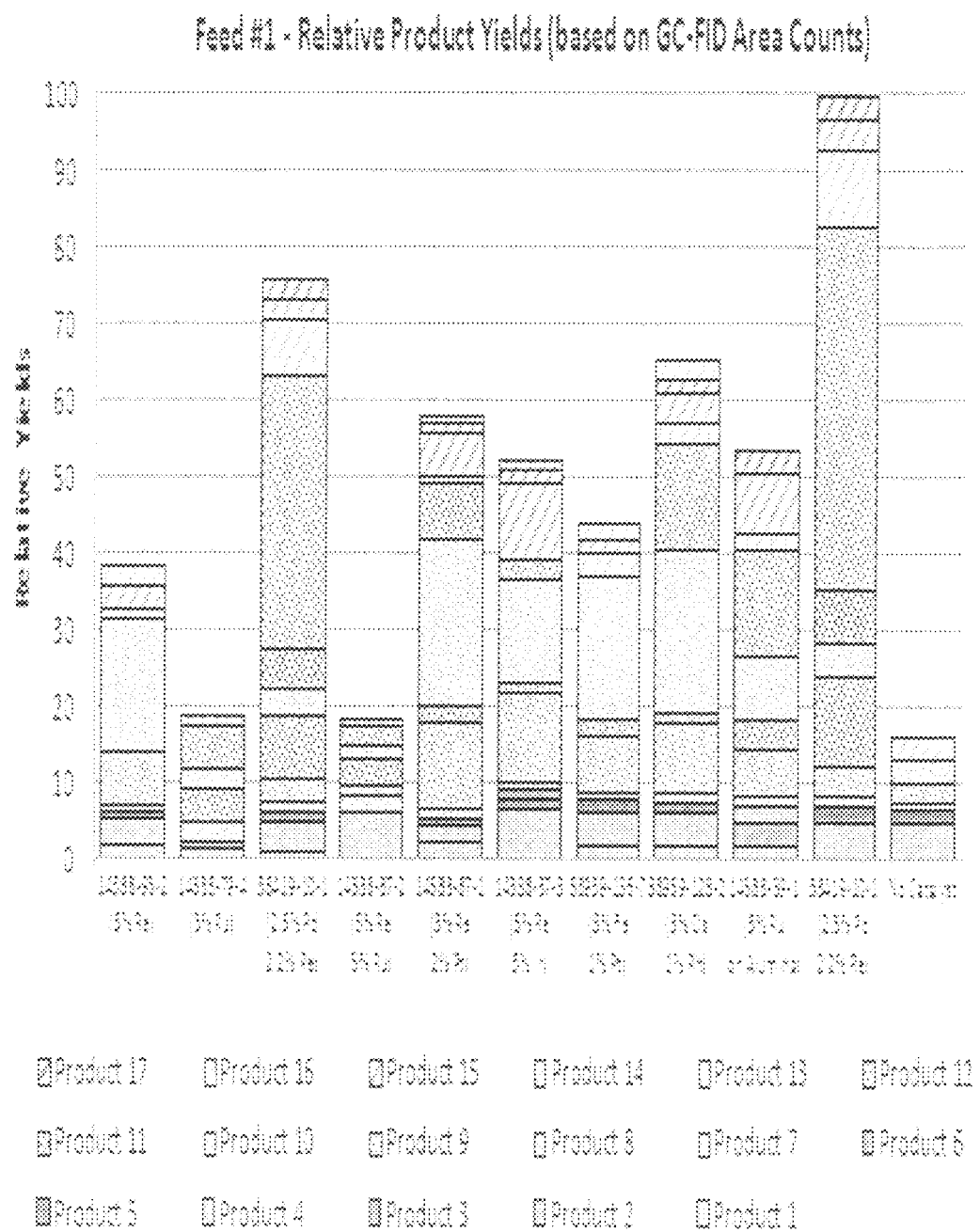

Results of catalyst screening are summarized in the FIGS. 2 and 3. As shown, catalysts 14388-79-4 and 14388-87-2 showed limited conversion of A2 (mono-aduct) in both the flow and batch system. Also, catalysts 58959-136-7 and 58959-128-2 showed the lowest conversion of ethyl levulinate in the flow testing. In the batch system 14388-93-2, 58959-136-7, and 58959-128-2 all showed low ethyl levulinate conversion.

In addition to looking at overall conversion of the main feedstock components, product distribution was examined. The control catalyst (58419-10-1) showed the highest overall recovery even accounting for ~10% scatter. In addition, product peak 12 was the major component. This was unique to the Pd/Re composition, since product peak 10 was the major component for the Re/Pt, Fe/Pt, and Os/Rh. This may be a function of the palladium. Only one catalyst from this group was prepared on alumina, 14388-39-1 (5% Ru). Compared to 14388-79-4 (5% Ru on carbon), 14388-39-1 showed a 35% increase in overall product yields and a 40% increase in mono-aduct conversion.

The final high throughput screening study focused on finding a replacement for the 2.5% Pd/2.5% Re control catalyst. The goal was to create a less expensive catalyst capable of performing the same chemistry. It was considered that this could be done in two ways: 1) replacing the rhenium with a less expensive secondary metal, and/or 2) reducing the amount of palladium.

Figure 4:
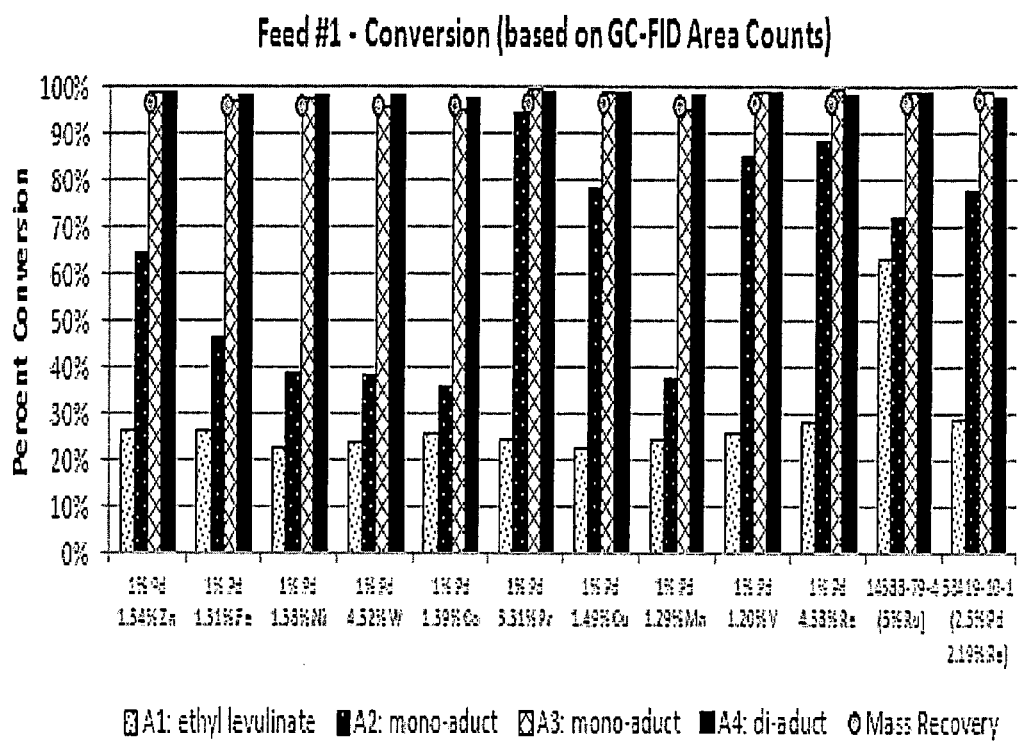
Figure 5:
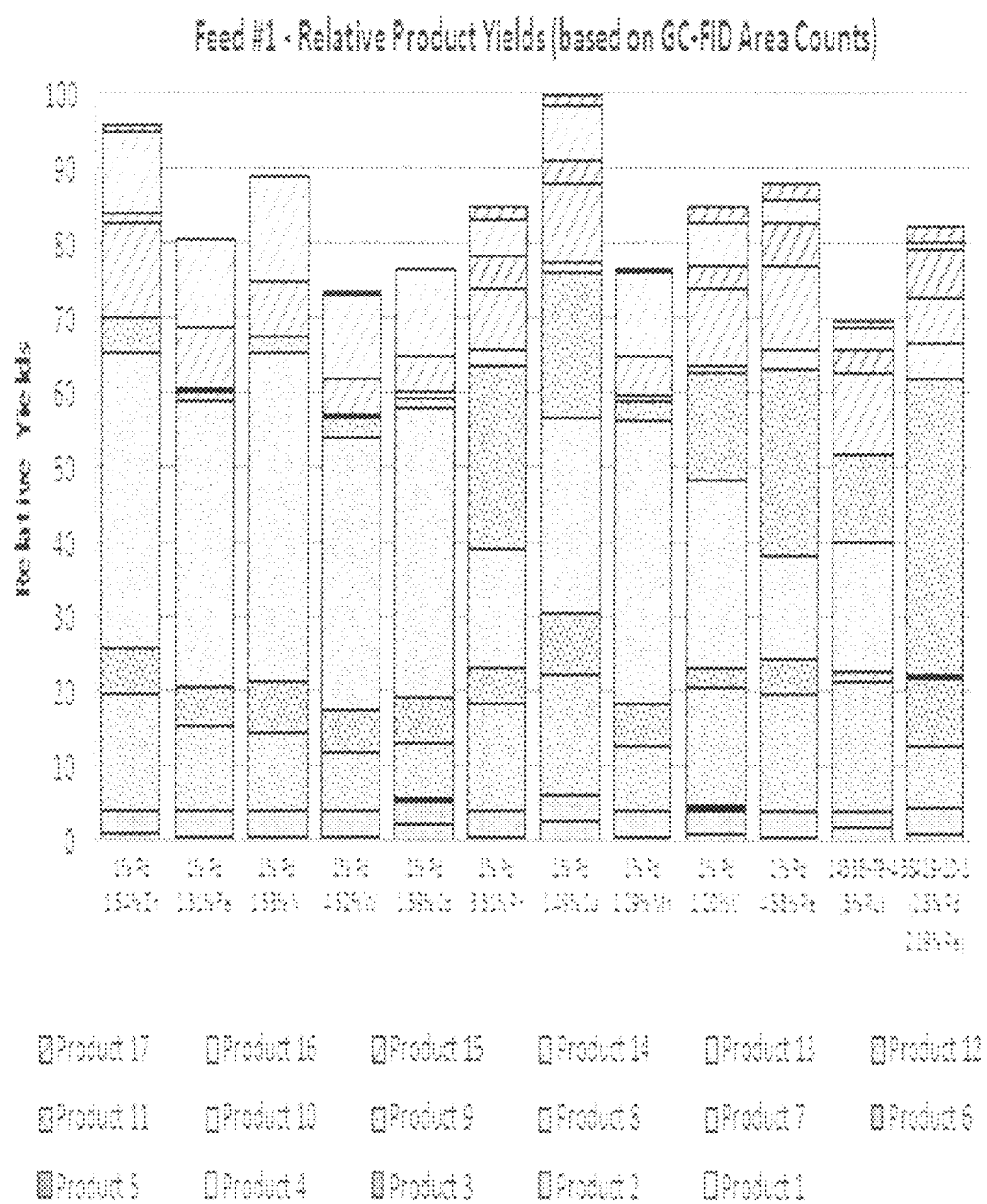

The various catalyst compositions were prepared using incipient wetness impregnation techniques that had been automated to run in a high throughput environment. In order to make comparisons between the catalysts tested in the previous batch experiments, three controls were run in this experiment. Catalyst 58419-10-1 (2.5% Pd/2.5% Re) served as the project control. Catalyst 14388-79-4 (5% Ru) provided a control for a catalyst which showed different activity and selectivity. Finally a 1% Pd/4.38% Re on Norit was prepared along with the other new catalysts compositions so that there was a freshly prepared catalyst similar to the control with the same amount and ratio between palladium and the secondary metal, in this case rhenium. Charts for both feedstocks conversions can be seen in FIGS. 4 and 5.

Examining the data from the levulinate feedstock emphasized several interesting trends. By reducing the amount of palladium, but doubling the amount of secondary metal (in this case rhenium), albeit was possible to achieve the same amount of conversion as the 58419-10-1 control. However, the product distribution was different: While 58419-10-1 showed almost no product peak 10 and mainly product peak 12, 1% Pd/4.38% Re showed a 1 to 3 ratio of product peak 10 to product peak 12. None of the catalysts resulted in anything as selective as 58419-10-1 for product peak 12. The closest was the Pd/Pr catalyst.

Comparing the conversion of the four feeds to the product distribution, it appears that the formation of product peak 12 may be linked to the conversion of A2 (mono-aduct). The Pd/Cu composition showed the highest overall relative product yields. The products were highly varied. Product peak 10 was the major product for most compositions, including those with Zn, Fe, Ni, W, Co, and Mn as a secondary metal.

Severe Hydrotreating

The Severe Hydrotreating, also known as hydrodeoxygenation, is generally the final step in the biorefinery process. In this step, the product mixture from the previous Mild Hydrotreating step is hydrogenated with a different catalyst at more severe conditions (higher temperature, higher pressure, lower space velocity) to remove all or substantially all of the oxygen from the final product.

Figure 6:
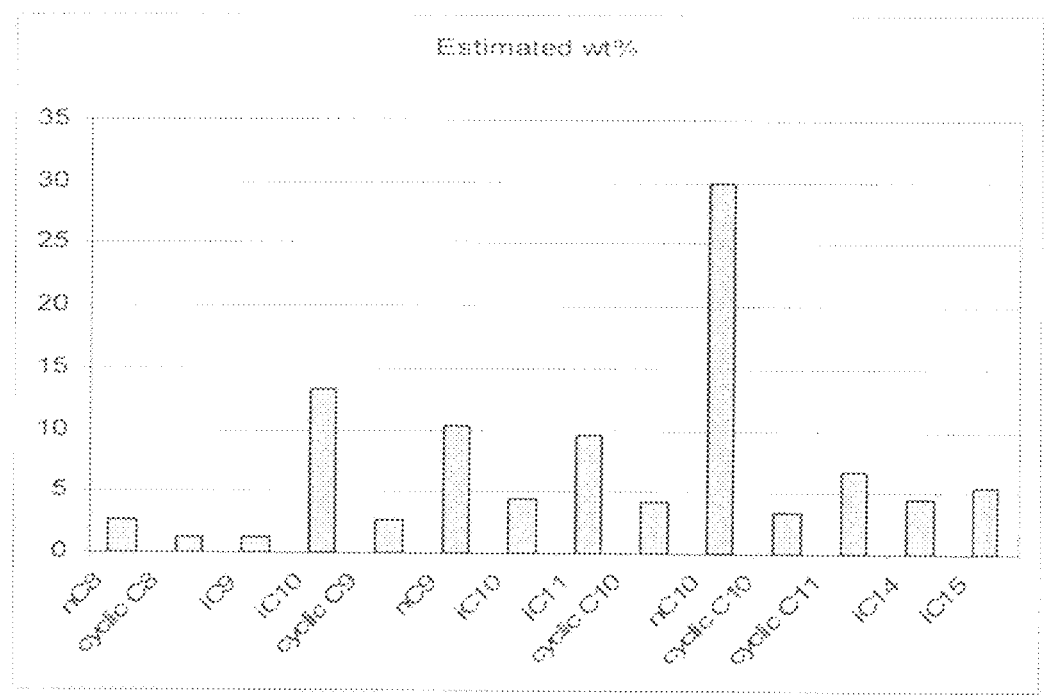
FIG. 6 is a graph depicting estimated composition of fully deoxygenated alkanes suitable for jet fuel or diesel blendstock.

A commercially available mixture of catalyst, primarily a sulfided NiMo formulation, was used to hydrodeoxygenate a condensation product including EL and furfural. The product from this treatment was a mixture of alkanes in the C8 to C15 carbon chain range and containing normal, iso, and cyclic saturated hydrocarbons. Estimated composition is displayed in FIG. 6.

Tests on a sample of a similar mixture showed a Freeze Point=−48.4 C with the JP-8 (Mil.) spec<−47 C. Testing also revealed that the material was very close to specification for JP-8 gravity and flash point. This testing is very encouraging for production of a renewable, cellulosic jet fuel. The hydrocarbon distribution is also very favorable for a renewable, cellulosic diesel fuel.

The fuel discussed above was produced during an extensive research project that was performed using existing pilot scale continuous flow hydrotreating reactor systems. A total of eight mild and severe hydrotreating runs were made with various catalyst loading strategies and the same family of commercial hydro-deoxygenation catalysts (supplied by Haldor Topsoe) for severe hydrotreating, and two catalysts (produced by PNNL) for mild hydrotreating. The goal of the severe hydrotreater runs was to investigate strategies to lengthen catalyst life and to make fuel product for testing. General findings were that pretreating the feed to partially deoxygenate and saturate double bonds is important for catalyst life, and pretreating with a targeted mild hydrotreating catalyst is likely better than pretreating with typical deoxygenation catalysts at lower severity.

It will be understood that the scope of the appended claims should not be limited by particular embodiments set forth herein, but should be construed in a manner consistent with the specification as a whole.

What is claimed is:

1. A method of making an alkane liquid fuel, the method comprising the steps of:
   (a) converting carbohydrate and lignocellulosic feedstock into chloromethylfurfural (CMF) and levulinic acid (LA) by treatment with hydrochloric acid in a biphasic reactor to produce reaction products from step (a) comprising CMF and LA;
   (b) converting the reaction products from step (a) comprising CMF and LA into hydroxymethylfurfural (HMF) and ethyl levulinate (EL) to produce reaction products from step (b) comprising HMF and EL;
   (c) converting the reaction products from step (b) comprising HMF and EL into longer carbon chain molecules via an aldol condensation reaction to produce condensation products from step (c); and
   (d) hydrotreating the condensation products from step (c) to
      (i) saturate the unsaturated bonds of the compounds contained in the condensation products from step (c); and
      (ii) deoxygenate the condensation products from step (c) to form an alkane liquid fuel product,
   wherein the step (d) further comprises a step of producing a cyclic ether compound.

2. The method of claim 1, wherein the cyclic ether compound includes at least one tetrahydrofuran.

3. A method of making an alkane liquid fuel, the method comprising the steps of:
   (a) converting carbohydrate and/or lignocellulosic feedstock into chloromethylfurfural (CMF) and levulinic acid (LA) by treatment with hydrochloric acid in a biphasic reactor to produce reaction products from step (a) comprising CMF and LA;
   (b) converting the reaction products from step (a) comprising CMF and LA into reaction products from step (b) comprising:
   (I) a furfural comprising:
      i) methylfurfural (MF) or
      ii) hydroxymethylfurfural (HMF) or
      iii) an alkoxymethylfurfural (AMF) or
      iv) a mixture of HMF and an AMF; and
   (II) a levulinic component, comprising:
      i) LA or
      ii) a levulinic ester (LE) of an alcohol or
      iii) a mixture of LA and LE;
   (c) converting the reaction products from step (b) comprising the furfural and the levulinic component into longer carbon chain molecules via an aldol condensation reaction to produce condensation products from step (c);
   (d) partially or fully saturating the condensation products from step (c) by hydrotreating to produce reaction products from step (d); and
   (e) deoxygenating the reaction products from step (d) to form an alkane liquid fuel product,
   wherein the step (e) further comprises a step of producing a cyclic ether compound.

4. A method of claim 3, wherein the cyclic ether compound includes at least one tetrahydrofuran.

* * * * *